(12) United States Patent
Okuma (10) Patent No.: US 10,558,610 B2
(45) Date of Patent: *Feb. 11, 2020

(54) UTILIZING FUNCTION APPARATUS, RECORDING MEDIUM, AND METHOD FOR COMPARING INFORMATION BEFORE AND AFTER CONNECTION RELEASE WITH AN EXTERNAL DEVICE

(71) Applicant: CASIO COMPUTER CO., LTD., Tokyo (JP)

(72) Inventor: Kentaro Okuma, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/175,583

(22) Filed: Oct. 30, 2018

(65) Prior Publication Data

US 2019/0065432 A1    Feb. 28, 2019

Related U.S. Application Data

(63) Continuation of application No. 15/240,796, filed on Aug. 18, 2016, now Pat. No. 10,146,734.

(30) Foreign Application Priority Data

Aug. 20, 2015   (JP) .................................. 2015-162586
Jun. 30, 2016   (JP) .................................. 2016-129982

(51) Int. Cl.
*G06F 13/40*        (2006.01)
*G06F 15/02*        (2006.01)

(52) U.S. Cl.
CPC ...... *G06F 15/0216* (2013.01); *G06F 13/4068* (2013.01)

(58) Field of Classification Search
CPC combination set(s) only.
See application file for complete search history.

(56) References Cited

U.S. PATENT DOCUMENTS 4,080,659 A    3/1978 Francini
4,796,215 A    1/1989 Hatta
(Continued)

FOREIGN PATENT DOCUMENTS

JP    2000010932 A    1/2000
JP       4839917 B    10/2011

OTHER PUBLICATIONS

Mechanism of B-CAS card (http://www.1000web.net/b-cas/); Partial English Translation. (3 pages).

*Primary Examiner* — Raymond N Phan
(74) *Attorney, Agent, or Firm* — Fitch, Even, Tabin & Flannery LLP (57) ABSTRACT

A utilizing function apparatus include at least one processor, and a memory storing instructions that, when executed by the at least one processor, causes the at least one processor to, based on an operation, set one of at least one function temporarily unable to be executed, when it is detected that the utilizing function apparatus is connected to an external device after setting the one function temporarily unable to be executed, acquire information about an area of the memory of the utilizing function apparatus, as first information, when it is detected that the connection with the external device is released, acquire the information about the area of the memory, as second information, and when the acquired first information and second information are different, set the one function back able to be executed.

16 Claims, 6 Drawing Sheets

(56) References Cited

U.S. PATENT DOCUMENTS

| | | | |
|---|---|---|---|
| 6,643,751 B2 | 11/2003 | Rosenquist et al. | |
| 7,222,207 B2 | 5/2007 | Falcon | |
| 8,131,887 B2 | 3/2012 | Fontana et al. | |
| 10,146,734 B2 * | 12/2018 | Okuma | G06F 15/0216 |
| 2008/0052700 A1 | 2/2008 | Han et al. | |

* cited by examiner

UTILIZING FUNCTION APPARATUS, RECORDING MEDIUM, AND METHOD FOR COMPARING INFORMATION BEFORE AND AFTER CONNECTION RELEASE WITH AN EXTERNAL DEVICE

CROSS-REFERENCE TO RELATED APPLICATIONS

This application is a continuation of U.S. patent application Ser. No. 15/240,796 filed Aug. 18, 2016, and claims priority to the prior Japanese Patent Application No. 2015-162586, filed on Aug. 20, 2015 and Japanese Patent Application No. 2016-129982, filed on Jun. 30, 2016, the entire contents of which are incorporated herein by reference.

BACKGROUND

1. Technical Field

The technical field relates to a utilizing function apparatus and a recording medium capable of setting whether or not to use one of at least one executable function.

2. Description of Related Art

In Western high schools, universities and the like, when taking an achievement examination and the like, students are allowed to carry a utilizing function apparatus such as an electronic calculator capable of executing at least one function in an examination place and to make calculations and the like by using the utilizing function apparatus during the examination, in some cases. One of the at least one function includes, but is not limited to, a program function. This is a convenient function that a user can prepare a desired program in advance, store the program in an internal storage device of the electronic calculator and read out and execute the program programmed in advance, as required later, on the basis of a user's operation.

However, even when the functions are convenient in the usual using scene, it may not be preferable in some cases that the functions are executed in a specific scene, for example, during the examination. For this reason, for example, a Japanese Patent Application Publication No. 2000-10932A discloses a utilizing function apparatus capable of making a setting so that one of at least one function, which can be executed by a utilizing function apparatus such as an electronic calculator, cannot be used on the basis of a user's operation.

SUMMARY OF THE INVENTION

A utilizing function apparatus according to an exemplary embodiment of the invention comprises:
at least one processor; and
a memory storing instructions that, when executed by the at least one processor, causes the at least one processor to:
execute at least one function;
based on an operation, set one of the at least one function temporarily unable to be executed;
when it is detected that the utilizing function apparatus is connected to an external device after setting said one function temporarily unable to be executed, acquire information about an item of an area of the memory of the utilizing function apparatus, as first information;
when it is detected that the connection with the external device is released after the connection with the external device is detected, acquire the information about the item of the area of the memory, as second information; and
when the acquired first information and second information are different, set said one function back able to be executed.

A non-transitory recording medium, according to an exemplary embodiment of the invention, has a program recorded thereon that is executable to control a computer to:
execute at least one function,
based on an operation, set one of the at least one function temporarily unable to be executed,
when it is detected that the computer is connected to an external device after setting said one function temporarily unable to be executed, acquire information about an item of an area of a memory of the computer, as first information,
when it is detected that the connection with the external device is released after the connection with the external device is detected, acquire the information about the item of the area of the memory, as second information, and
when the acquired first information and second information are different, set said one function back able to be executed.

BRIEF DESCRIPTION OF THE DRAWINGS

The components in the drawings are not necessarily to scale relative to each other.

DETAILED DESCRIPTION

Figure 1:
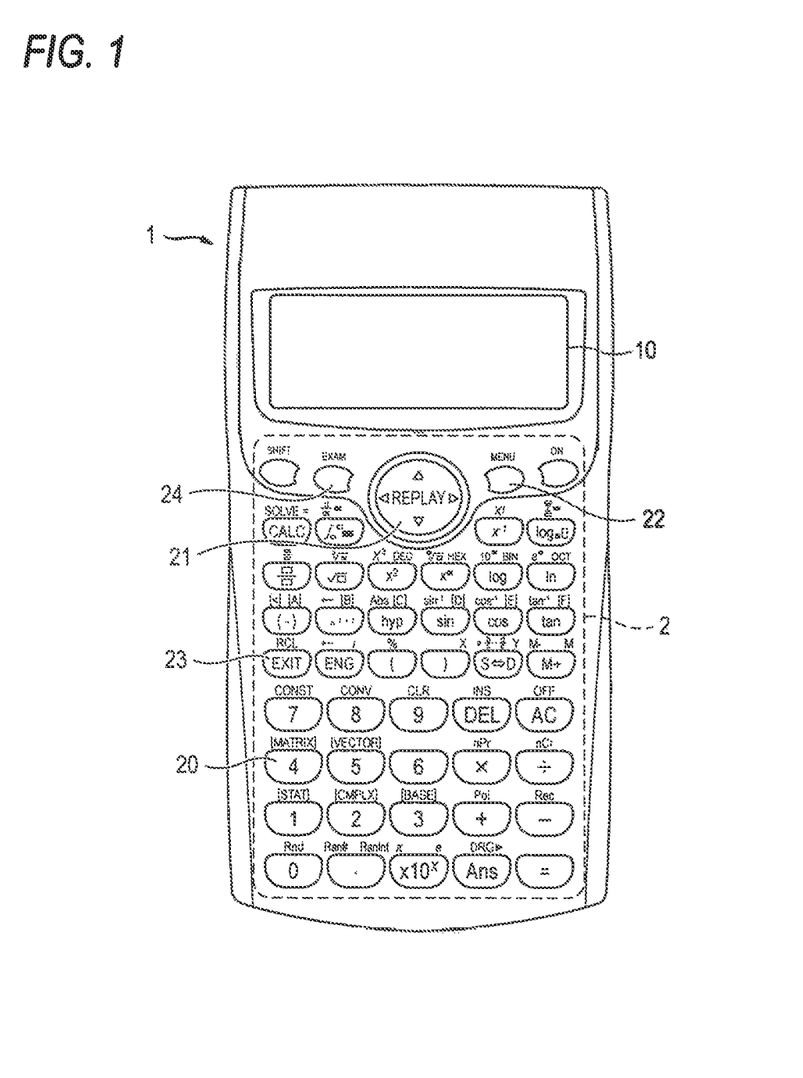
FIG. 1 is a plan view depicting a schematic appearance of an electronic calculator, which is an example of a utilizing function apparatus.

FIG. 1 is a plan view depicting an electronic calculator, which is an example of a utilizing function apparatus according to an exemplary embodiment. In other exemplary embodiments, the utilizing function apparatus may be an electronic dictionary, an educational tablet or the like but is not limited thereto.

As shown in FIG. 1, an electronic calculator 1 has an input key group 2 including a variety of key groups and a display 10. The input key group 2 is just an example of an input device. In other exemplary embodiments, the input device may be any one of a keyboard, a touch panel and a microphone or a combination thereof but is not limited thereto. The touch panel is provided to overlap an entire display screen of the display 10 and may be configured so that a user can make an input by touching the touch panel. Also, the display 10 is just an example of an output device. In other exemplary embodiments, the output device may be any one of a projector, a printer and a speaker or a combination thereof but is not limited thereto.

The input key group 2 includes a plurality of keys configured to receive an input operation of equation constituting elements such as numerical values and computation symbols from a user and to receive an instruction operation of a variety of processing, and inherent functions are allotted to the respective keys. In the exemplary embodiment, the input key group 2 has a ten-key 20, a cursor key 21, a MENU key 22, an EXIT key 23, an EXAM key 24 and the like.

The ten-key 20 is to receive a number input. The cursor key 21 is configured to any one of four upper, lower, left and right directions in accordance with a pressed position. For example, when an upper part (a part having a mark Δ stamped thereto) of the cursor key 21 is pressed, a cursor displayed in the display screen of the display 10 can be moved upward. This is also the same for the other directions.

The MENU key 22 is a key for displaying a list of at least one function, which can be executed by the electronic calculator 1, on the display screen of the display 10. The EXIT key 23 is a key for stopping a function under execution. The EXAM key 24 is a dedicated key for setting an Exam Mode. Instead of providing the dedicated key for setting the Exam Mode, a configuration where when a plurality of arbitrary keys determined in advance is pressed simultaneously or in predetermined order, the Exam Mode is set may also be adopted.

A configuration where when all keys included in the input key group 2 are operated in combination of another key or input method, a separate function is executed may also be adopted. Also, a configuration where when the keys are executed in different execution modes, different functions are executed may also be adopted.

The display 10 consists of a liquid crystal display or the like, and is configured to display numbers, symbols, various data and the like in correspondence to operations of the input key group 2 and the like.

[Internal Configuration]

Figure 2:
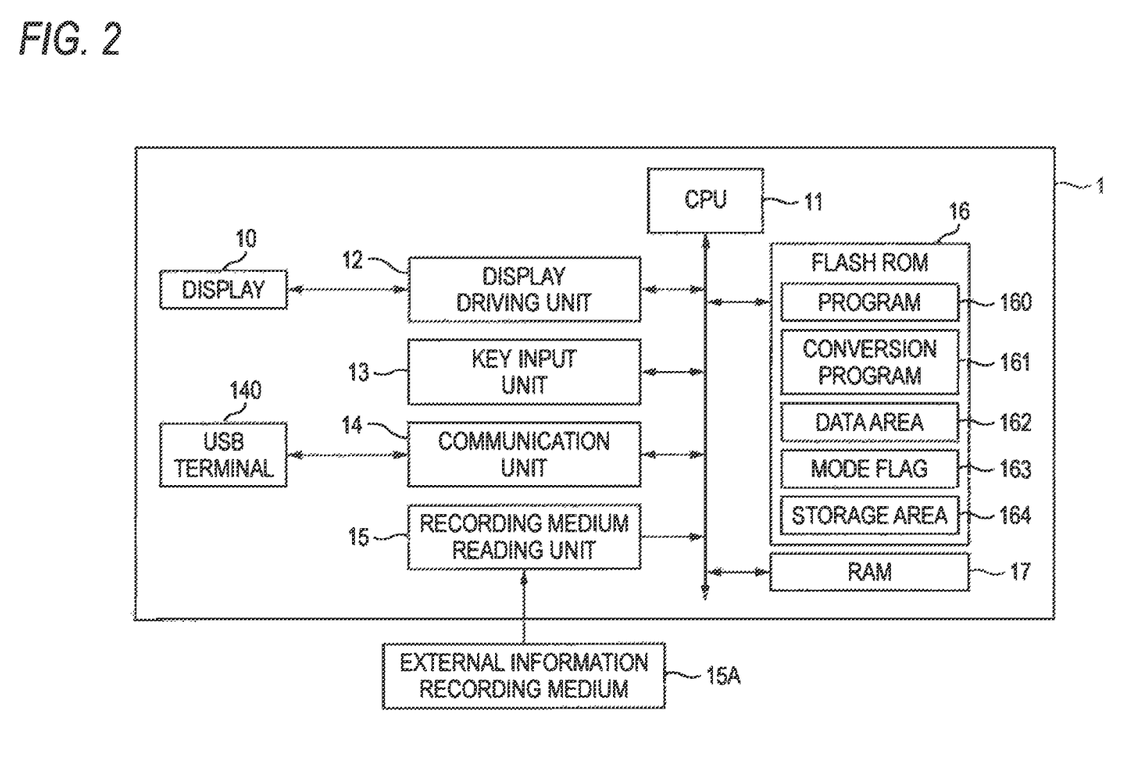
FIG. 2 is a block diagram depicting an internal configuration of the electronic calculator.

FIG. 2 is a block diagram depicting an internal configuration of the electronic calculator 1. As shown in FIG. 2, the electronic calculator 1 has a processor 11, a display driving device 12, a key input unit 13, a communication unit 14, a recording medium reading unit 15, a flash ROM (Read Only Memory) 16 and a RAM (Random Access Memory) 17.

The display driving device 12 is configured to control driving of the display 10 so as to display a variety of information on the display screen of the display 10, based on a signal from the processor 11. The display driving device 12 may be the same processor as the processor 11. Also, the display driving device 12 may be integrated with the display 10, or may be a separate processor from the processor 11.

The key input unit 13 includes the input key group 2. When each key of the input key group 2 is pressed by the user, the key input unit 13 outputs a key input signal corresponding to the pressed key to the processor 11. Based on the received key input signal, the processor 11 is configured to display a number, a symbol or the like corresponding to the key input signal on the display screen of the display 10, to execute computation corresponding to the key input signal and to display a variety of obtained data on the display screen of the display 10.

The communication unit 14 is an interface with an outside, and has a USB terminal 140 and the like, for example. The electronic calculator 1 can be connected in communication with an external device 50 such as a PC shown in FIG. 4A through the USB terminal 140 and a USB cable.

The communication connection between the electronic calculator 1 and the external device 50 is not limited to the wired connection by the USB cable and the like, and may be wireless connection by short-distance wireless communication such as NFC and Bluetooth or wireless LAN communication. Preferably, the electronic calculator 1 and the external device 50 can be connected to each other by one or more connection forms capable of accessing at least some storage area of the flash ROM 16 or RAM 17 embedded in the electronic calculator 1 or an external information recording medium 15A mounted to the recording medium reading unit 15 of the electronic calculator 1 from the external device 50 in a data-editable manner, when the electronic calculator 1 and the external device 50 are connected to each other.

The recording medium reading unit 15 is configured to read information from the external information recording medium 15A such as a memory card to be detachably mounted, on the basis of a signal from the processor 11.

Meanwhile, in the exemplary embodiment, a program to be described later may be read from the external device 50 through the communication unit 14 or may be read from the external information recording medium 15A via the recording medium reading unit 15. To the contrary, a program to be described later may be recorded to the external device 50 or the external information recording medium 15A from the electronic calculator 1 through the communication unit 14.

The flash ROM 16 has a program storage area 160 configured to store therein a variety of programs including the program of the exemplary embodiment, a conversion program storage area 161 configured to store therein a conversion program for converting a format of data and the like to a format that can be read by the external device 50 so as for the external device 50 to recognize a variety of data and the like described to a format specific to the electronic calculator 1, and a data area 162 configured to store therein data and the like necessary for computation and the like in the electronic calculator 1.

Also, the flash ROM 16 has a mode flag storage area 163 configured to store therein a mode flag F indicating whether the Exam Mode has been set, and a conversion data storage area 164, which is a storage area configured to store therein a variety of data and the like of which formats have been converted by the conversion program. Meanwhile, in the exemplary embodiment, the conversion data storage area 164 is a storage area that can be accessed from the external device 50 (external memory) in a data-editable manner, and is simply referred to as the storage area 164. Also, the RAM 17 is a kind of the storage means, and is used as a work area and the like when the processor 11 carries out a variety of processing.

The processor 11 is configured to control the respective units of the electronic calculator 1. The processor 11 is configured to read out one or more programs from a system program and a variety of application programs stored in the program storage area 160 of the storage unit 16, to develop the same into the work area of the RAM 17, and to execute a variety of processing including execution of the at least one function in cooperation with the programs developed into the RAM 17. Also, the processor 11 is configured to control the display driving device 12 and to display the information on the display 10, in accordance with contents of the read program or a user's operation. The output destination of the information is not limited to the display 10 and may be any one of the projector, the printer and the speaker or a combination thereof, as described above.

Figure 3:
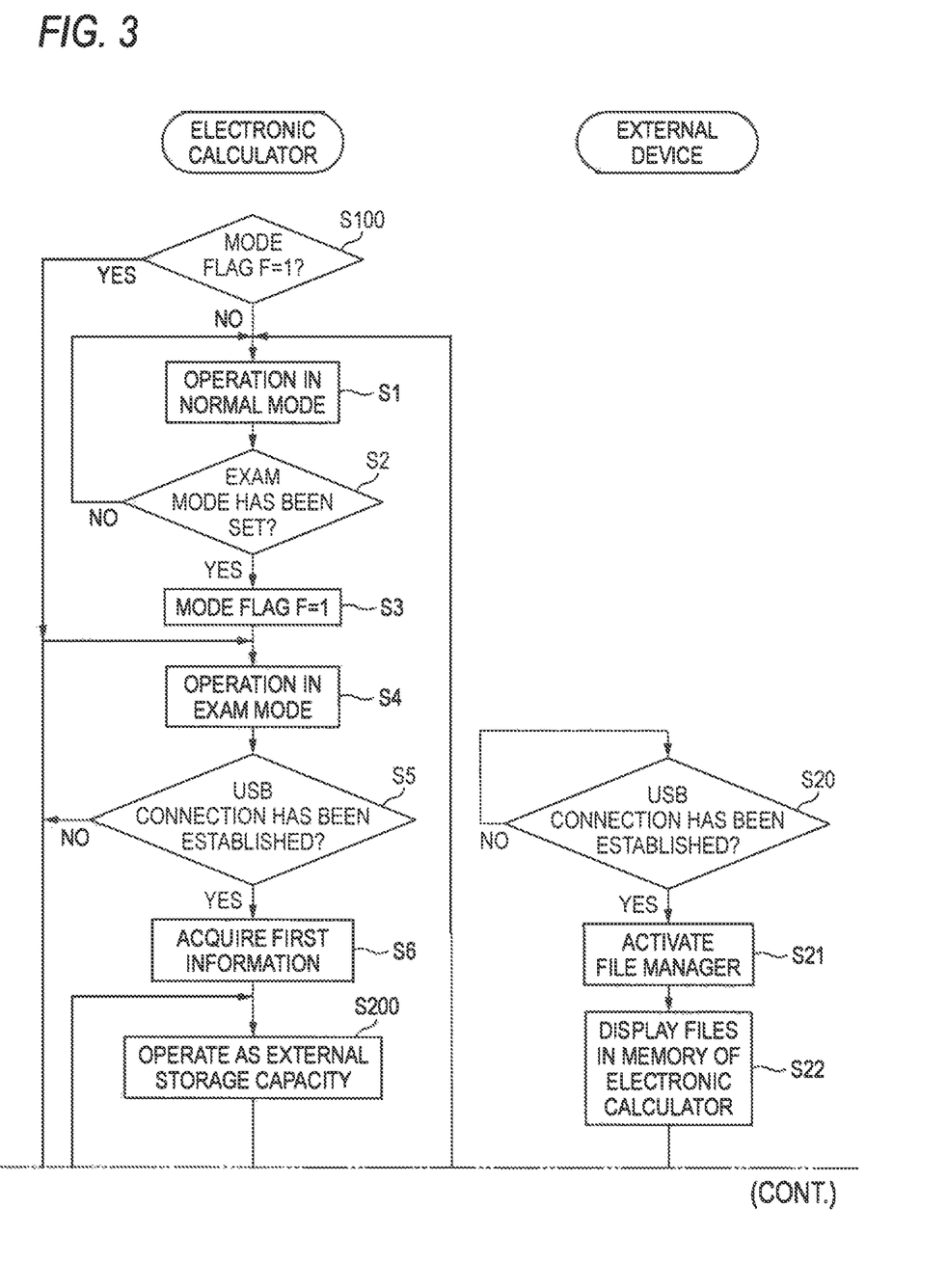
FIG. 3 is a flowchart depicting operations and the like of a processor of the electronic calculator.

FIG. 3 is a flowchart depicting operations of the electronic calculator 1 of the exemplary embodiment. The respective units of the electronic calculator 1 are controlled by the processor 11 configured to operate in accordance with the program developed into the RAM 17, so that the operations shown in the flowchart are implemented. FIG. 3 shows an example of a plurality of functions which can be executed by the electronic calculator 1.

When an AC key of the input key group 2 is pressed, the processor 11 turns on the electronic calculator 1, reads out the mode flag F stored in the mode flag storage area 163 of the flash ROM 16, and determines whether the Exam Mode has been set (step S100).

When the mode flag F is '0' (step S100; No), the electronic calculator 1 is in a normal mode. At this state, the processor 11 can execute all of the functions, which can be executed by the electronic calculator 1, on the basis of the user's operation and the like (step S1). In the exemplary embodiment, a state where all the functions can be used is referred to as "function utilization non-limit mode" or "normal mode."

When the mode flag F is '1' (step S100; Yes), the electronic calculator 1 is in an Exam Mode. At this state, the processor 11 does not execute one or some functions of the plurality of functions, which can be executed by the electronic calculator 1 (step S4). In the exemplary embodiment, a state where one or some functions cannot be used is referred to as "specific function utilization limit mode" or "Exam Mode."

While the electronic calculator 1 executes the functions in the normal mode with the processor 11, the processor 11 always monitors whether the Exam Mode has been set on the basis of a user's preset operation. When the Exam Mode is set during the execution of the electronic calculator 1 in the normal mode (step S2; Yes), the processor 11 changes the mode flag F stored in the mode flag storage area 163 of the flash ROM 16 to '1', thereby setting an execution mode of the electronic calculator 1 to the Exam Mode (step S3). The user's preset operation includes but is not limited to an operation that the EXAM key 24 or the like of the input key group 2 is pressed, for example. In the meantime, as a using method of the Exam Mode, the user performs an operation of setting the electronic calculator 1 to the Exam Mode before an examination starts, in accordance with a teacher's instruction at an examination place, for example. In addition to this scene, the Exam Mode may be set on the basis of the user's operation.

In the Exam Mode, the processor 11 controls the display driving device 12 to display a character string including characters of "EXAM" or "EXAMINATION" on the display 10. Thereby, the user can recognize that the electronic calculator 1 is in the Exam Mode. Also, in the Exam Mode, the electronic calculator 1 is set so that one or more functions (hereinafter, referred to as "utilization limit target functions"), which are considered as not preferable when they are executed during the examination, of the above-described program functions cannot be used. The processor 11 controls the respective units of the electronic calculator 1 to execute various functions within the set range (step S4).

Although not limited to a following example, the processor 11 does not activate the utilization limit target function in the Exam Mode even when it receives a key input signal from a key for activating the utilization limit target function of the input key group 2. Also, during the Exam Mode, when the MENU key 22 is pressed by the user and the list of the plurality of functions, which can be executed by the electronic calculator 1, is displayed on the display screen of the display 10, the processor 11 grayout-displays or does not display icons for activating one or more utilization limit target functions of the plurality of functions so that the icons cannot be selected by a cursor, or when the input device includes the touch panel, the processor does not activate a corresponding function even though a position of the touch panel corresponding to the icon is touched. Thereby, during the Exam Mode, the user can execute only simple operations such as but not necessarily limited to four arithmetic operations and the like by using the electronic calculator 1.

Figure 4A:
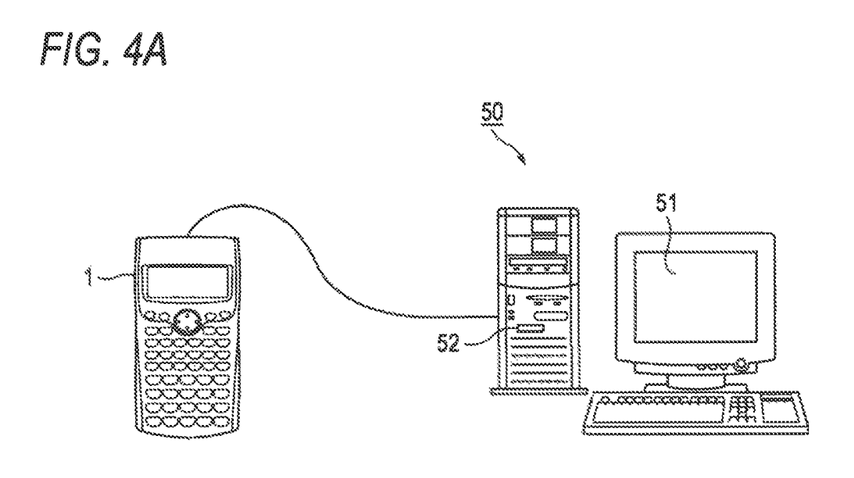
FIG. 4A depicts a state where the electronic calculator and an external device are connected to each other.

The processor 11 always monitors whether USB connection has been established between the electronic calculator 1 and the external device 50 while the power supply of the electronic calculator 1 is on. As shown in FIG. 4A, the user physically connects the USB terminal 140 of the electronic calculator 1 and a USB terminal (not shown) of the external device 50 by using a USB cable, so that communication starts between the processor 11 of the electronic calculator 1 and a processor 52 of the external device 50 through the USB cable.

As a result of the communication, when the USB connection is established (the connection is physically and logically established) between the electronic calculator 1 and the external device 50, the establishment of the USB connection is detected by the processor 11 of the electronic calculator 1 (step S5; Yes). When the establishment of the USB connection with the external device 50 is detected, the processor 11 of the electronic calculator 1 acquires first information about predetermined items of the storage area 164 of the flash ROM 16 (step S6). The first information may be an available capacity A1 of the storage area 164 of the flash ROM 16 (hereinafter, also referred to as 'first available capacity A1') but is not limited thereto.

Also, when the USB connection is established between the electronic calculator 1 and the external device 50, a part of the storage area of the flash ROM 16 of the electronic calculator 1 operates as an external storage capacity of the external storage device 50, and can be accessed by the processor 52 of the external device 50, as described later (step S200).

In the meantime, as a result of the communication, when the USB connection is established between the electronic calculator 1 and the external device 50, the establishment of the USB connection is detected by the processor 52 of the external device 50 (step S20; Yes). When the establishment of the USB connection with the electronic calculator 1 is detected, the processor 52 of the external device 50 activates a file manager function, which is one of standard functions of the basic software installed in the external device 50, automatically or on the basis of a user's operation, as described later.

In a storage device (not shown) of the external device 50, an OS (Operating System), which is the basic software for operating the external device 50, has been installed in advance, so that the OS operates while the power supply of the external device 50 is on. The processor 52 of the external device 50 activates a variety of applications stored in a storage device, which can be recognized by the external device 50, on the basis of a user's input operation to the OS. The processor 52 operates on the basis of the user's input operation to the OS and the various applications, so that the external device 50 can execute a variety of processing. The user's input operation, a processing result corresponding to each operation and the like are displayed on a display unit 51 of the external device 50 shown in FIG. 4A by the processor 52 of the external device 50.

The OS of the external device 50 includes but is not limited to "Microsoft Windows" (registered trademark) and "OS X" (registered trademark). Specifically, a case where the OS of the external device 50 is "Microsoft Windows" (registered trademark) is described. The processor 52 of the external device 50 always monitors a user's input operation to the OS. When it is detected that a predetermined input operation (for example, double click and the like) to an icon of "computer" displayed on a desktop of the OS is received on the basis of the user's operation, the processor 52 activates a file manager, which is one of standard applications mounted in the OS (step S21). The file manager may be automatically activated by the processor 52 of the external device 50 when the processor 52 of the external device 50 detects that the USB connection has been established between the external device 50 and the electronic calculator 1.

In the case of "Microsoft Windows" (registered trademark), "Windows Explore" (registered trademark) is normally mounted as the file manager. In the exemplary embodiment, it is simply referred to as the file manager for simplicity. Also in the drawings for explanation, instead of "Windows Explore" (registered trademark) itself, functions of the file manager are simply depicted for explanation.

Figure 4B:
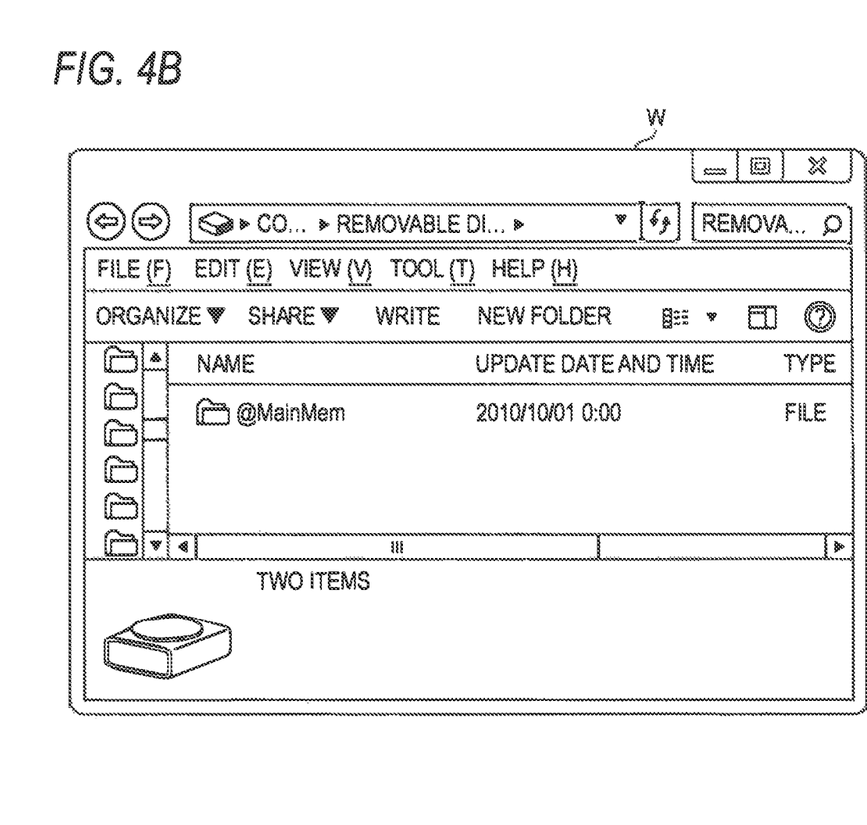
FIG. 4B depicts a storage state in the electronic calculator displayed on a display unit of the external device.

When the file manager is activated, a window W of "computer" is displayed on the display unit 51 by the processor 52 of the external device 50, as shown in FIG. 4B. When it is determined that a predetermined input operation (for example, double click) to an icon such as 'mobile disk' in the window W is received on the basis of the user's operation, the processor 52 of the external device 50 accesses the storage area 164 of the flash ROM 16 of the electronic calculator 1, and displays a name list of files stored in the storage area 164 in the window W being displayed on the display unit 51 (step S22).

At a state where the window W displaying the name list of files in the storage area 164 of the flash ROM 16 of the electronic calculator 1 is displayed on the display unit 51 of the external device 50, the processor 52 of the external device 50 adds one or more new files (additionally writes data) to the storage area 164, deletes (erases data) one or more files already stored in the storage area 164 or rewrites a file (changes the data) on the basis of the user's operation (step S23). In the specification, the description 'edition of a file' includes at least one processing of addition, deletion and rewriting of a file. Likewise, in the specification, the description 'edition of data' includes at least one processing of additional writing, erasing and change of data.

When editing the file or data in the storage area 164, any file having a file size, which is not zero (0), of a text format may be added to the storage area 164 of the flash ROM 16 of the electronic calculator 1, as a dummy file. Also, for example, a dummy file previously added to the storage area 164 by the user and having a file size, which is not zero (0), may be deleted from the storage area 164. Also, text data included in the dummy file previously added to the storage area 164 by the user is changed and the dummy file is overwritten to the storage area 164, so that a file may be rewritten.

Since the file manager is one of a plurality of standard functions mounted in the OS, it is not necessary for the user to separately install the file manager into the OS in advance. Therefore, the processor 52 of the external device 50 may display the name list of one or more files stored in the storage area 164 of the flash ROM 16 of the electronic calculator 1 on the display unit 51 of the external device 50 or edit (deletion, addition, update and the like of a file) each file by using only the standard functions of the OS (basic software), based on the user's operation. When performing the processing in this way, it is not necessary for the user to separately install a dedicated application and the like into the OS in advance.

The processor 52 of the external device 50 monitors all the time whether the USB connection between the external device 50 and the electronic calculator 1 is released while the power supply of the external device 50 is on (step S24).

The processor 52 of the external device 50 always monitors the user's input operation to the OS. When a predetermined input operation (for example, a right click) to an icon such as 'mobile disk' in the window W displayed on the display unit 51 of the external device 50 is received on the basis of the user's operation, the processor 52 of the external device 50 displays a plurality of operation menus (not shown) including "connection release" in the window W. When it is detected that "connection release" is clicked, the processor 52 of the external device 50 releases the logical connection between the external device 50 and the electronic calculator 1 (releases the USB connection) and changes the display of the display unit 51 so as to indicate that the mobile disk is at a release state by setting the icon such as "mobile disk" in the window W to a non-display state (step S24; Yes). At this state, there is no problem even if the USB cable physically connected to the electronic calculator 1 and the external device 50 is released. In the meantime, even when the USB cable is removed from at least one of the electronic calculator 1 and the external device 50 and the physical connection is thus released before the logical connection is released, the USB connection is released. At this time, the processor 52 of the external device 50 changes the display of the display unit 51 so as to indicate that the mobile disk is at the release state.

In this way, when the USB connection between the electronic calculator 1 and the external device 50 is released, the release of the USB connection is detected by the processor 11 of the electronic calculator 1 (step S7; Yes). When the release of the USB connection with the external device 50 is detected, the processor 11 of the electronic calculator 1 acquires second information about predetermined items of the storage area 164 of the flash ROM 16 (step S8). The items relating to the second information are the same as the items relating to the first information. In the exemplary embodiment, since the item relating to the first information is an available capacity of the storage area 164 of the flash ROM 16, the processor 11 acquires an available capacity A2 (hereinafter, also referred to as 'second available capacity A2') of the storage area 164 as the second information, also in step S8.

Figure 5:
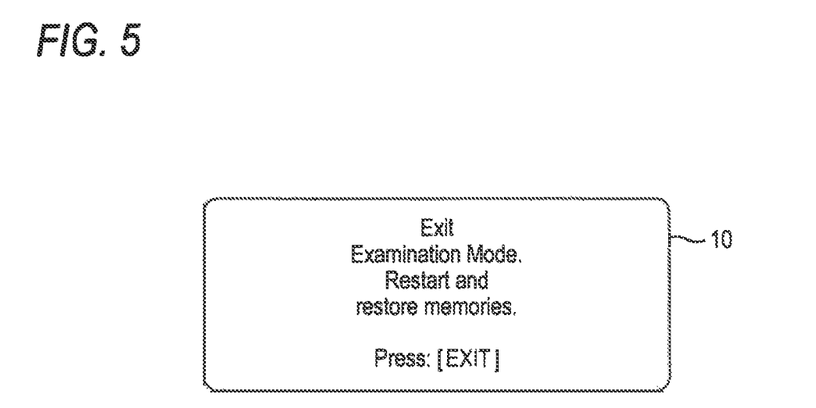
FIG. 5 depicts an example of a display that is to be displayed on a display of the electronic calculator.

The processor 11 of the electronic calculator 1 compares the second available capacity A2, which is the second information, and the first available capacity A1, which is the first information (step S9). When it is determined that the two available capacities A1, A2 are different, the processor 11 of the electronic calculator 1 controls the display driving device 12 to display a notification message, which urges the user to press the EXIT key 23, on the display 10, as shown in FIG. 5, for example (step S10). Also, when it is determined that the EXIT key 23 is pressed (step S11; Yes), the processor 11 releases the Exam Mode of the electronic calculator 1 (step S9; release Exam Mode). On the other hand, when it is determined that the two available capacities A1, A2 are the same, the processor 11 keeps the Exam Mode without executing processing of releasing the Exam Mode (step S9; keep Exam Mode).

In this case, although not limited to a following example, the processor may be configured to calculate a difference A1-A2 between the first available capacity A1 and the second available capacity A2. When the difference A1-A2 is not zero (0), the processor 11 may determine that the two available capacities A1, A2 are different. Alternatively, the processor 11 may simply compare the two available capacities A1, A2 and may determine that the two available capacities are different when they are not matched.

When the processor 11 of the electronic calculator 1 releases the Exam Mode, the processor 11 changes the mode flag F stored in the mode flag storage area 163 of the flash ROM 16 to '0,' thereby setting the execution mode of the electronic calculator 1 to the normal mode (step S12).

The above exemplary embodiment is just one example of exemplary embodiments and the exemplary embodiments are not limited to the above. In other exemplary embodiments, when the two available capacities A1, A2 are different, i.e., when it is determined that there is a change in the available capacity of the storage area 164 of the flash ROM 16 before and after the connection with the external device 50, the processor 11 of the electronic calculator 1 may immediately release the Exam Mode (step S9; release Exam Mode) without notifying the message in step S10 and may switch the operation mode of the electronic calculator 1 to the normal mode.

In the above exemplary embodiment, while the USB connection is established between the electronic calculator 1 and the external device 50, one or more new files can be added to the storage area 164 of the flash ROM 16 of the electronic calculator 1 on the basis of the user's operation, and any file having a file size, which is not zero (0), is added as a dummy file. However, in other exemplary embodiments, in step S23, any file having a file size, which is zero (0), may be added as a dummy file, based on the user's operation.

In this case, when the establishment of the USB connection with the external device 50 is detected in step S6, the processor 11 of the electronic calculator 1 acquires a name list L1 of files in the storage area 164, as the first information about the predetermined items of the storage area 164 of the flash ROM 16. Thereafter, when the release of the USB connection with the external device 50 is detected in step S8, the processor 11 of the electronic calculator 1 again acquires a name list L2 of files in the storage area 164, as the second information about the predetermined items of the storage area 164 of the flash ROM 16.

Then, the processor 11 of the electronic calculator 1 compares the two acquired name lists L1, L2 of files in step S9. When it is determined that the two name lists L1, L2 of files are different, more specifically, when a file, the name of which is included in one of the name list L1 of files and the name list L2 of files but is not included in the other of the name list L1 of files and the name list L2 of files, exists, the processor 11 releases the Exam Mode (step S9; release Exam Mode) and switches the operation mode of the electronic calculator 1 to the normal mode (step S12). On the other hand, when it is determined that the two name lists L1, L2 of files are the same (step S91; No), the processor 11 keeps the Exam Mode (step S9; keep Exam Mode) without executing the processing of releasing the Exam Mode.

In other exemplary embodiments, when any file having a file size, which is zero (0), is added as a dummy file on the basis of the user's operation in step S23, the processor 11 may operate as follows.

When the establishment of the USB connection with the external device 50 is detected in step S6, the processor 11 of the electronic calculator 1 acquires the name list L1 of files in the storage area 164 and a size V1$_{n1}$ of each file (n1: an integer of zero or greater), as the first information relating to the predetermined items of the storage area 164 of the flash ROM 16. Then, when the release of the USB connection with the external device 50 is detected in step S8, the processor 11 of the electronic calculator 1 again acquires the name list L2 of files in the storage area 164 and a size V1$_{n2}$ of each file (n2: an integer of zero or greater), as the second information relating to the predetermined items of the storage area 164 of the flash ROM 16.

Then, the processor 11 of the electronic calculator 1 compares the two acquired name lists L1, L2 of files in step S9. When it is determined that a file, which is not included in the name list L1 of files, is included in the name list L2 of files and a size of the corresponding file is zero (0), the processor 11 releases the Exam Mode (step S9; release Exam Mode) and switches the operation mode of the electronic calculator 1 to the normal mode (step S12). On the other hand, when it is determined that the two name lists L1, L2 of files are the same (step S91; No), the processor 11 keeps the Exam Mode (step S9: keep Exam Mode) without executing the processing of releasing the Exam Mode.

The case where a file, which is not included in the name list L1 of files, is included in the name list L2 of files means that a file is added to the storage area 164 of the flash ROM 16 of the electronic calculator 1 during the USB connection between the electronic calculator 1 and the external device 50. Also, when a size of the added file is zero (0), there is a high possibility that the corresponding file is a dummy file.

While various embodiments have been described herein above, it is to be appreciated that various changes in form and detail may be made without departing from the spirit and scope of the invention(s) presently or hereafter claimed.

The invention claimed is:

1. An electronic function utilizing apparatus comprising:
    at least one processor; and
    a memory storing instructions that, when executed by the at least one processor, causes the at least one processor to:
        execute at least one function of a plurality of functions executable by the processor;
        based on an operation, set the at least one function as temporarily unable to be executed;
        when it is detected that the electronic function utilizing apparatus is connected to an external device after said at least one function is set as temporarily unable to be executed, acquire first information about the memory of the electronic function utilizing apparatus;
        when it is detected that the connection with the external device is released after the connection with the external device is detected, acquire second information about the memory;
        compare the acquired first information and second information; and
        when it is determined that the acquired first information and second information are different as a result of the comparison, set said at least one function back as able to be executed.

2. The electronic function utilizing apparatus according to claim 1, wherein the at least one processor, under control of the instructions, acquires a first available capacity of an area of the memory, as the first information, acquires a second available capacity of an area of the memory, as the second information, and sets said at least one function back as able to be executed when the first available capacity and the second available capacity are different.

3. The electronic function utilizing apparatus according to claim 1, wherein the at least one processor, under control of the instructions, acquires a first list of names of files stored in the memory, as the first information, acquires a second list of names of files stored in the memory, as the second information, and sets said at least one function back as able to be executed when there is a file whose name is included in one of the first list of file names and the second list of file names but is not included in the other of the first list of file names and the second list of file names.

4. The electronic function utilizing apparatus according to claim 1, wherein the at least one processor, under control of the instructions, acquires a first list of names of files stored in the memory and sizes of the respective files, as the first information, acquires a second list of names of files stored in the memory and sizes of the respective files, as the second information, and, sets said at least one function back as able to be executed when a size of a file, the name of which is included in the second list of file names but is not included in the first list of file names is zero (0).

5. The electronic function utilizing apparatus according to claim 1, wherein when executed by the at least one processor, the instructions cause the at least one processor to further:
enable the external device to edit data in the memory when the electronic function utilizing apparatus is connected to the external device.

6. The electronic function utilizing apparatus according to claim 1, wherein the at least one function is a function that is preferably not to be executed during an examination, and the operation that sets said at least one function as temporarily unable to be executed comprises an operation that is inputted before the examination.

7. The electronic function utilizing apparatus according to claim 1, wherein when executed by the at least one processor, the instructions cause the at least one processor to further:
control a display to output a result of the execution of said at least one function, based on the operation via a keyboard.

8. The electronic function utilizing apparatus according to claim 1, further comprising:
a keyboard configured to receive a user's operation to execute the at least one function; and
a display to which at least a result of execution of the at least one function is to be output, based on the user's operation.

9. A non-transitory recording medium having a program recorded thereon that is executable to control a computer to:
execute at least one function of a plurality of functions executable by the processor,
based on an operation, set the at least one function as temporarily unable to be executed,
when it is detected that the computer is connected to an external device after said at least one function is set as temporarily unable to be executed, acquire first information about a memory of the computer,
when it is detected that the connection with the external device is released after the connection with the external device is detected, acquire second information about the memory,
compare the acquired first information and second information; and
when it is determined that the acquired first information and second information are different as a result of the comparison, set said at least one function back as able to be executed.

10. The non-transitory recording medium according to claim 9, wherein the computer, under control of the program, acquires a first available capacity of an area of the memory, as the first information, acquires a second available capacity of an area of the memory, as the second information, and sets said at least one function back as able to be executed when the first available capacity and the second available capacity are different.

11. The non-transitory recording medium according to claim 9, wherein the computer, under control of the program, acquires a first list of names of files stored in the memory, as the first information, acquires a second list of names of files stored in the memory, as the second information, and sets said at least one function back as able to be executed when there is a file whose name is included in one of the first list of file names and the second list of file names but is not included in the other of the first list of file names and the second list of file names.

12. The non-transitory recording medium according to claim 9, wherein the computer, under control of the program, acquires a first list of names of files stored in the memory and sizes of the respective files, as the first information, acquires a second list of names of files stored in the memory and sizes of the respective files, as the second information, and sets said at least one function back as able to be executed when a size of a file, the name of which is included in the second list of file names but is not included in the first list of file names, is zero (0).

13. The non-transitory recording medium according to claim 9, wherein the program is further executable to control the computer to: enable the external device to edit data in the memory when the computer electronic calculator is connected to the external device.

14. The non-transitory recording medium according to claim 9, wherein the at least one function is a function that is preferably not to be executed during an examination, and the operation that sets said at least one function as temporarily unable to be executed comprises an operation that is inputted before the examination.

15. The non-transitory recording medium according to claim 9, wherein the program is further executable to control the computer to:
control a display to output a result of execution of said at least one function, based on the operation via a keyboard.

16. A method for controlling an electronic function utilizing apparatus having at least one processor and a memory that stores instructions for being executed by the at least one processor, the method comprising:
the processor executing the instructions to perform the following operations:
executing at least one function of a plurality of functions executable by the processor;
based on an operation, setting the at least one function as temporarily unable to be executed;
when it is detected that the electronic function utilizing apparatus is connected to an external device after said at least one function is set as temporarily unable to be executed, acquiring first information about the memory of the electronic function utilizing apparatus;
when it is detected that the connection with the external device is released after the connection with the external device is detected, acquiring second information about the memory;
comparing the acquired first information and second information; and
when it is determined that the acquired first information and second information are different as a result of the comparison, setting said at least one function back as able to be executed.

* * * * *